April 29, 1930.    A. KATZINGER    1,756,558
BAKING TRAY
Filed Dec. 17, 1927
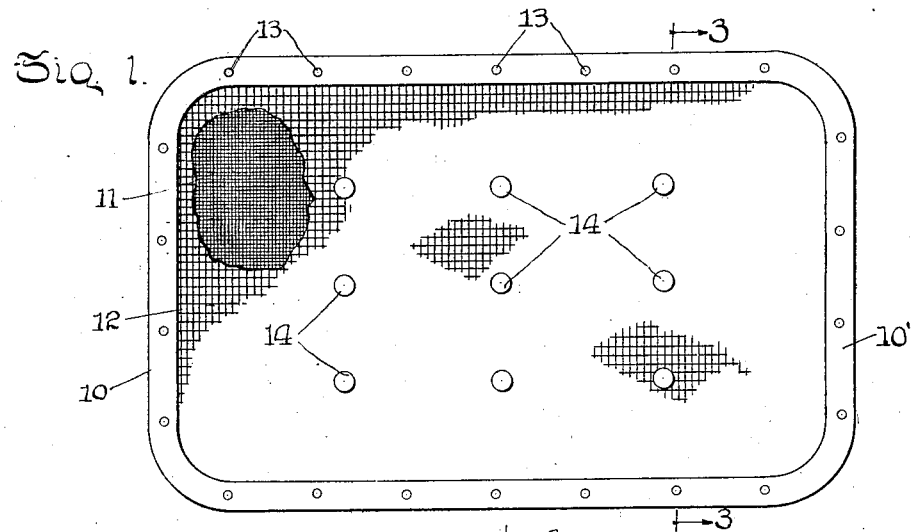
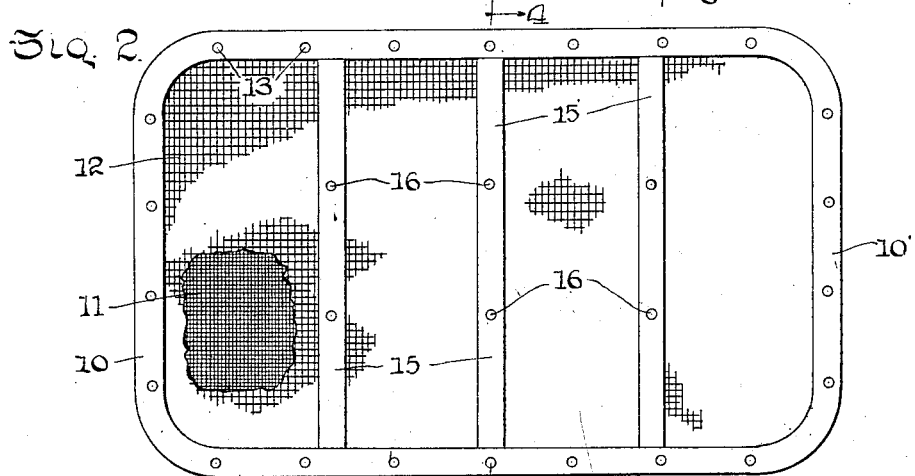
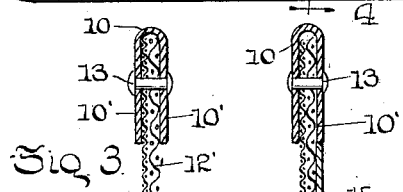
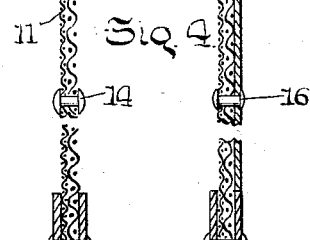
Witness
William P. Kilroy
Inventor
Arthur Katzinger
By Charles S. Wilson
attys Patented Apr. 29, 1930

1,756,558

UNITED STATES PATENT OFFICE

ARTHUR KATZINGER, OF GLENCOE, ILLINOIS, ASSIGNOR TO EDWARD KATZINGER COMPANY, OF CHICAGO, ILLINOIS, A CORPORATION OF ILLINOIS

BAKING TRAY

Application filed December 17, 1927. Serial No. 240,730.

This invention relates generally to baking equipment and apparatus and particularly to a baking tray designed for use in baking the so-called hearth breads and rolls, such for instance as rye and Vienna breads and French rolls.

It is the object of the present invention to provide a tray for supporting a number of loaves or rolls during the proofing and baking operation which permits the loaves or rolls carried thereby to be handled as a unit.

Among its other objects, the present tray contemplates combining all of the advantages of baking directly on the hearth or oven floor with multiple manipulation of the loaves or rolls and the maintenance of sanitary conditions in connection therewith.

With the above and other objects in view, as will be apparent, this invention consists in the construction, combination and arrangement of parts, all as hereinafter more fully described, claimed and illustrated in the accompanying drawings, wherein:

Fig. 1 is a plan view of a baking tray constructed in accordance with the present invention.

Fig. 2 is a similar view of a somewhat modified structure;

Fig. 3 is a transverse section taken along line 3—3 of Fig. 1; and

Fig. 4 is also a transverse section taken along line 4—4 of Fig. 2.

Heretofore in the baking of hearth or full-crusted bread or rolls, the dough after being formed and molded, has been placed on the floor or hearth of the oven by a peel; one or two loaves or rolls being handled by the peel at one time. After the baking process is complete the bread or rolls are removed from the oven also by the use of the peel. The manipulation of the bread or rolls with a peel requires considerable experience and skill in handling, and occupies much time with the result that hearth or full-crusted bread and rolls have been more expensive to produce than has the pan bread or rolls which could be handled in groups of pans. Since hearth or full-crusted bread or rolls requires the entire surface of the loaf or roll to be subjected to direct heat, in order that the perfect full crust characteristic thereof might be attained, either single or group pan structures for baking such bread or rolls has not proven satisfactory and consequently the advantages of quick group handling of the loaves or rolls afforded by such methods have not been heretofore available in the baking of hearth or full-crusted bread or rolls.

The present invention is designed to provide a device or tray which will permit the group handling of a number of loaves of hearth or full-crusted bread, or rolls, as the case may be. It contemplates a tray or pan upon which a plurality of loaves or rolls may be placed and handled as a unit and at the same time be maintained in their proper spaced relative positions and subjected to the necessary direct heat to produce the desired crust.

The present tray or pan proposes the positioning of the loaves or rolls so that the heat has direct unimpeded contact with all surfaces thereof and yet have the loaves or rolls supported from direct contact with the oven floor thereby improving the sanitary conditions under which such bread is produced.

Reference being had more particularly to the drawing, 10 designates a rectangular frame of any suitable size composed of strap metal rebent longitudinally to form the parallel spaced gripping arms or sides 10'. A wire screen bottom 11 is interposed between the sides of the frame 10 and extends into the space between the arms 10' of the frame structure. This screen bottom 11 is constructed of wire gauze or screening of 16-mesh or less and is therefore relatively light and fine. It is upon the surface of this bottom 11 that the molded dough constituting the loaves or rolls is directly placed and the mesh of the gauze or screening is sufficiently small to prevent the passage of the dough therethrough and yet large enough to allow the heat to pass freely into contact with the dough mass upon all sides thereof.

A 16-mesh wire gauze or screen bottom 11 is not, by its very nature, sufficiently strong to resist or stand up under the severe conditions that are met in ordinary practice by the average bakery equipment. In order to reinforce and strengthen the bottom 11 a relatively heavy coarse wire screen auxiliary bottom 12 is carried by the frame 10 in intimate contact with the bottom 11 and also extends to and into the space between the arms 10' of said frame. The auxiliary bottom 12 and the bottom of the tray are permanently retained engaged by the frame 10 by means of the pressure of the arms 10' and by the rivets, or other suitable fastening means 13 which pierce the arms 10' of the frame 10 and pass through the portions of the bottoms 11 and 12 therebetween, as shown in Figs. 3 and 4.

In order to maintain the bottoms 11 and 12 in intimate contact and to further strengthen the entire structure as well as provide guides for the positioning of the loaves or rolls, the bottoms 11 and 12 are, at spaced intervals, pierced and held by rivets or other devices 14. These rivets are so positioned that by placing the rolls or loaves between them and not upon them, a proper spacing and relationship of the rolls may be maintained.

As an alternative structure for the rivets 14, strips of strapping 15 may be interposed between the sides of the frame 10 and be held in place by rivets 16 or other suitable fastening means which pierce the straps 15 and the bottoms 11 and 12. These straps 15 bear against the auxiliary bottom 12 and act as additional support for the bottoms 11 and 12 and as guides for the positioning of the loaves or rolls on the bottom 11.

In use, the rolls or loaves are placed directly upon the bottom 11 in the spaces delineated by the rivets 14 in one case and 16 in the other. After this the tray is placed in the oven so that the auxiliary bottom 12 adjoins or rests upon the floor of the oven. In the event the tray is constructed as illustrated in Figs. 2 and 4, wherein the straps 15 are coplanar with the lower arms 10' of the frame 10, the straps 15 will be adjoining and/or upon the floor of the oven.

It will be observed in either form of the invention that the heads of the rivets 13 may contact with the floor of the oven, in the event they are not flush with the surface of the frame 10, thereby slightly elevating the frame 10 from the oven floor and permitting a full and free circulation of heat under the frame 10 and bottom 12 and through both bottoms 11 and 12. Should the frame 10 rest directly on the oven floor, as would be the case if the heads of the rivets 13 were flush with the surface of the frame, the heat passes through the bottoms 11 and 12 and has uninterrupted contact with all sides of the dough mass.

From the foregoing it is clear that the tray forming the subject matter of the present invention may be handled as a unit whereby a number of rolls or loaves may be manipulated at one time. The heat will contact at all times with all surfaces of the loaves or rolls upon the bottom 11 whereby a complete bake is accomplished and a full crust produced. Manifestly the structure is strong and durable and capable of resisting the wear incidental to the use thereof in commercial bakeries.

It is to be further noted that by providing a guide for the spacing of the dough masses on the tray, the haphazard spacing of the dough masses on the oven floor as accomplished by the use of peels is entirely eliminated.

Claims:

1. In a tray for baking hard-crusted breads, the combination with a relatively fine meshed bottom for contact with the dough, supported by and in contact with a relatively coarse meshed bottom, a frame composed of strap metal rebent longitudinally to form parallel spaced flanges enclosing and gripping the sides and ends of said bottoms, and reinforcing means between the sides and ends of said bottom constituting transverse bars riveted to said bottoms and extending between the sides of said frame.

2. In a tray for baking hard-crusted breads, the combination with a relatively fine meshed bottom for contact with the dough, supported by and in contact with a relatively coarse meshed bottom, a frame composed of strap metal rebent longitudinally to form parallel spaced flanges enclosing and gripping the sides and ends of said bottoms, and reinforcing means between the sides and ends of said bottoms constituting spaced rows of rivets piercing said bottoms and extending between the sides of said frame.

3. In a tray for baking hard-crusted breads, the combination with a relatively fine meshed bottom for contact with the dough, supported by and in contact with a relatively coarse meshed bottom, a frame composed of strap metal rebent longitudinally to form parallel spaced flanges enclosing and gripping the sides and ends of said bottoms, guiding and reinforcing means between the sides and ends of said bottoms constituting transverse bars riveted to said bottoms and extending between the sides of said frame.

4. In a tray for baking hard-crusted breads, the combination with a relatively fine meshed bottom for contact with the dough, supported by and in contact with a relatively coarse meshed bottom, a frame composed of strap metal rebent longitudinally to form parallel spaced flanges enclosing and gripping the sides and ends of said bottoms, guiding and reinforcing means between the sides and ends of said bottoms constituting spaced rows of rivets piercing said bottoms and extending between the sides of said frame.

ARTHUR KATZINGER.